US012695414B2

(12) United States Patent
Banerjee

(10) Patent No.: US 12,695,414 B2
(45) Date of Patent: Jul. 28, 2026

(54) MODULAR PHOTOVOLTAIC ASSEMBLY WITH INTEGRATED SPECTRAL CONVERSION AND LOCALIZED ENERGY STORAGE

(71) Applicant: Sonjib Banerjee, Bangalore (IN)

(72) Inventor: Sonjib Banerjee, Bangalore (IN)

( * ) Notice: Subject to any disclaimer, the term of this patent is extended or adjusted under 35 U.S.C. 154(b) by 0 days.

(21) Appl. No.: 19/276,025

(22) Filed: Jul. 22, 2025

(65) Prior Publication Data

US 2025/0350233 A1     Nov. 13, 2025

Related U.S. Application Data

(63) Continuation-in-part of application No. 18/842,630, filed as application No. PCT/IB2023/055367 on May 25, 2023, now Pat. No. 12,597,885.

(30) Foreign Application Priority Data

Jun. 17, 2022     (IN) .............................. 202241034767

(51) Int. Cl.
*H02S 20/32*          (2014.01)
*H02S 40/22*          (2014.01)

(52) U.S. Cl.
CPC .............. *H02S 20/32* (2014.12); *H02S 40/22* (2014.12)

(58) Field of Classification Search
None
See application file for complete search history.

(56) References Cited

U.S. PATENT DOCUMENTS

| | | | |
|---|---|---|---|
| 5,409,550 A | 4/1995 | Safir | |
| 10,608,134 B2 | 3/2020 | Wheelwright et al. | |
| 2007/0152154 A1 | 7/2007 | Decamp | |
| 2010/0018570 A1 * | 1/2010 | Cashion .................. | H10F 77/63 |
| | | | 136/246 |
| 2010/0089436 A1 | 4/2010 | Watters | |
| 2011/0067687 A1 * | 3/2011 | Raymond ............... | F24S 23/31 |
| | | | 126/700 |

(Continued)

FOREIGN PATENT DOCUMENTS

| | | | |
|---|---|---|---|
| CN | 203434178 U | 2/2014 | |
| WO | WO-2017160704 A1 * | 9/2017 | ............. H10F 19/00 |

*Primary Examiner* — Ryan S Cannon
(74) *Attorney, Agent, or Firm* — S.J. INTELLECTUAL PROPERTY LTD.

(57)          ABSTRACT

A photovoltaic generation assembly is disclosed, comprising a plurality of vertically oriented solar tubes, each aligned with a corresponding Fresnel lens mounted on a movable Fresnel lens holder. The system includes a height adjustment assembly that controls the vertical position of the Fresnel lenses to optimize light focus based on solar movement. The adjustment mechanism may include a stepper motor driving a gear-based shaft assembly, or alternatively, a solenoid-based system that magnetically elevates or lowers the lens holder. Each solar tube incorporates a down-conversion assembly to shift high-energy photons, an up-conversion assembly to convert low-energy infrared photons into usable light, and a reflective base for photon recycling. An optional thermoelectric layer recovers heat energy. The arrangement increases photon absorption via internal reflections, improving solar conversion efficiency and enabling multiband energy harvesting from a compact, modular solar architecture.

9 Claims, 4 Drawing Sheets

(56) References Cited

U.S. PATENT DOCUMENTS

| | | |
|---|---|---|
| 2012/0285505 A9 | 11/2012 | McCoy, Jr. |
| 2013/0063807 A1 | 3/2013 | Dam |
| 2016/0099362 A1 | 4/2016 | Bellette |
| 2016/0254781 A1 | 9/2016 | Pisharodi |
| 2018/0203285 A1 | 7/2018 | Safrani |
| 2022/0247343 A1 | 8/2022 | Wang |
| 2023/0041955 A1 | 2/2023 | Paik |

* cited by examiner

MODULAR PHOTOVOLTAIC ASSEMBLY WITH INTEGRATED SPECTRAL CONVERSION AND LOCALIZED ENERGY STORAGE

REFERENCE TO RELATED APPLICATION

The application is in continuation-in-part to U.S. application Ser. No. 18/842,630 titled AN ASSEMBLY FOR SOLAR PANELS WITH ULTRACAPACITOR-BATTERY HYBRID STORAGE SYSTEM filed on 29 Aug. 2024, with inventor Sonjib Banerjee, the content of which are incorporated herein by reference.

FIELD

The present invention relates to the field of solar energy harvesting and storage systems. More particularly, the present invention pertains to advanced photovoltaic (PV) assemblies that integrate spectral conversion technologies, localized energy storage.

BACKGROUND

The increasing energy demand at load centers such as residential complexes, commercial hubs, and industrial zones is predominantly met through centralized utility-based power generation. This model necessitates the use of elaborate transmission and distribution infrastructure including transformers, transmission towers, trenching, and extensive cabling systems. These systems contribute to significant transmission and distribution losses, increased carbon footprint, pilferage, and heightened susceptibility to faults, accidents, and other electrical hazards.

Although photovoltaic (PV) technology offers an opportunity for decentralized clean energy generation, conventional solar panels, such as monocrystalline, polycrystalline, PERC, bifacial, or Heterojunction (HJT) variants are fundamentally limited in efficiency and scalability. These panels, typically deployed in a two-dimensional X-Y plane, are constrained by a theoretical maximum efficiency of approximately 33.7% for a 1.34 eV bandgap. Practically, their efficiency ranges between 18-25%, generating about 180-250 W/m$^2$ under standard conditions. Due to this limited output, a substantial surface area is required for PV installations to match the energy demands of modern load centers. However, such surface area is often unavailable or insufficient at the point of consumption, thereby reinforcing dependency on grid-based electricity.

Furthermore, incident solar radiation spans a wide spectrum (300 nm to 2700 nm), but conventional crystalline silicon (c-Si) solar cells are only responsive to a narrower band (300 to 900 nm). Photons within this range can excite electrons from the valence band to the conduction band, enabling electricity generation. However, excess photon energy beyond the bandgap is dissipated as heat, reducing conversion efficiency. Photons with wavelengths between 900 to 2700 nm possess insufficient energy to initiate this electron transition, resulting in further energy loss. Conventional solar panels lack any mechanism for spectral management such as up-conversion or down-conversion to effectively utilize these otherwise wasted photons.

Additionally, the conventional solar assembly design presents other technical inefficiencies. After photon-induced excitation, the free electrons must traverse interlaced metallic busbars and long DC cables to reach external storage systems. The resistance and impedance in these lengthy conductive paths cause power losses and voltage drops, undermining the efficiency of the energy harvesting process.

Moreover, traditional PV systems are highly angle-dependent. To minimize reflective losses and optimize incident radiation, the modules must be inclined at precise angles relative to the sun's position. This requirement often mandates complex mechanical tracking systems or static frames, both of which are prone to failure, increase structural load, and add to installation and maintenance costs. The elevated and exposed nature of panel arrays also increase vulnerability to lightning strikes and environmental degradation, including abrasion from dust and damage from bird activity.

Maintenance of such sprawling and delicate solar systems is operationally challenging and costly, particularly when integrated with rigid metallic framing and exposed wiring networks.

Therefore, there exists a compelling need for a high-efficiency photovoltaic generation assembly that overcomes these challenges. Accordingly, a modular photovoltaic assembly with integrated spectral conversion and localized energy storage is disclosed herein.

SUMMARY

The present invention relates to a modular, multi-layered photovoltaic (PV) generation assembly designed to maximize solar energy conversion efficiency through advanced light management, spectral conversion, and dynamic lens positioning. The system comprises a plurality of vertically oriented solar tubes, each aligned with a corresponding Fresnel lens mounted on a Fresnel lens holder. These lenses concentrate incident sunlight into each solar tube, where the light undergoes multiple internal reflections, enhancing photon absorption and increasing the energy conversion rate.

Each solar tube incorporates a transparent protective cover, a down-conversion assembly for converting high-energy ultraviolet photons into visible wavelengths, and an up-conversion assembly that converts low-energy infrared photons into usable visible light. A reflective base at the bottom of each tube reflects unabsorbed light back into the tube for extended photon interaction, while a thermoelectric generation layer further captures thermal energy to generate additional electrical output.

To optimize light, focus and maximize solar capture throughout the day, the system features a height adjustment assembly that dynamically varies the distance between the Fresnel lenses and the solar tube openings. This adjustment may be achieved using a gear-driven mechanism powered by a slow-rotating stepper motor or, in an alternative embodiment, via a solenoid-based magnetic actuator that vertically displaces the Fresnel lens holder in response to solar movement.

The solar cells are arranged in layers inside each tube and are electrically connected to nearby Ultra Capacitors for immediate charge collection. A tessellated configuration of multiple such tubes forms a compact, scalable assembly. This close-proximity electrical architecture reduces energy loss, enhances storage efficiency, and enables high-density integration of solar tubes.

Overall, the invention presents a high-efficiency, multi-functional solar generation system capable of harvesting a broader spectrum of solar radiation while minimizing losses due to optical inefficiencies or thermal dissipation.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
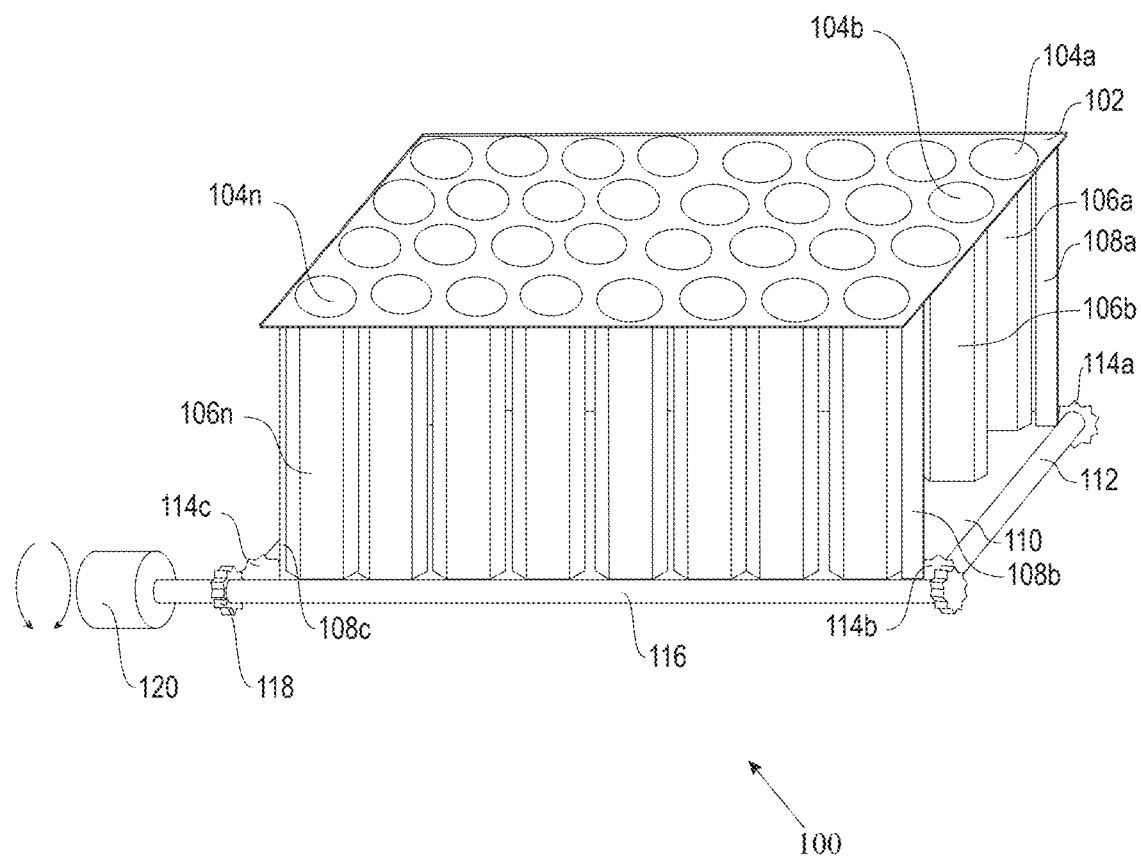
FIG. 1 illustrates a perspective view of a Photovoltaic (PV) generation assembly, including an array of solar bricks arranged in a sloped configuration, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below", or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

The present invention is a modular, robotically assembled three-dimensional photovoltaic system designed to significantly enhance solar energy harvesting. Each solar brick in the system comprises a plurality of solar tubes, and a plurality of solar cells are connected in series within each solar tube. The plurality of solar tubes is connected in parallel within the solar brick. Further, the solar bricks are connected in series across the system, enabling optimized electrical performance and fault tolerance. This configuration delivers up to 52% higher current output compared to conventional two-dimensional (2D) solar tubes. Unlike rigid or manually assembled three-dimensional (3D) PV structures in the prior art, the invention introduces a novel limb-based architecture, robotically constructed, connector-free limbs that serve as both structural supports and electrical conduits. This innovation enables scalable, automated manufacturing, overcoming the handling challenges of delicate solar cells. The open-cell frame design allows full ambient airflow and thermal dissipation, while a nanomembrane within a breather, with pores smaller than water molecules, protects sensitive components from moisture without hindering ventilation. Collectively, the system provides a high-efficiency, modular, and serviceable solar solution with superior adaptability, manufacturability, and long-term performance compared to existing 3D photovoltaic technologies.

FIG. 1 illustrates a perspective view of a Photovoltaic (PV) generation assembly (100). The PV generation assembly (100) comprises a plurality of solar tubes (106a-106n) arranged on a base (110), a plurality of Fresnel lenses (104a-104n), a Fresnel lens holder (102), a main shaft (116), a secondary shaft (112), a set of vertical gear shafts including (108a-108d) where the vertical gear shaft (118d) is positioned at a hind corner (not shown in FIG. 1), a stepper motor (120), a main gear (118), and a set of secondary gears (114a-114c). Typically, on a top opening of each solar tube (106a), a Fresnel lens (104a) is aligned. So basically, the plurality of Fresnel lenses (104a-104n) is aligned on the Fresnel lens holder (102) in such a manner, that each Fresnel lens is above a corresponding solar tube. For example, Fresnel lens (104a) is above solar tube (106a), Fresnel lens (104b) is above solar tube (106b), and so on.

The main shaft (116), the secondary shaft (112), the set of vertical gear shafts (108a-108c) and the fourth vertical gear shaft, the stepper motor (120), the main gear (118), and the set of secondary gears (114a-114d) wherein the (114d) secondary gear is positioned at the hind corner not shown in FIG. 1, form part of a height adjustment assembly. The height adjustment assembly, is configured to raise the Fresnel lens holder (102) along a vertical direction, in order to control a distance of the each Fresnel lens (104a) from a top opening of the each solar tube (106a). Further, the height adjustment assembly is configured to adjust an orientation of the plurality of Fresnel lenses (104a-104n) in response to solar movement, ensuring optimal solar capture.

The stepper motor (120) is programmed to rotate continuously at a very low speed, to produce a vertical displacement of the Fresnel lens holder (102) ranging from 0.05 to 0.2 mm in a span of 8-12 hours. At every movement of the stepper motor (120), the main gear (118) rotates, which in turn rotates the main shaft (116), and conjoining secondary shafts (e.g. 112). Rotation of the secondary shaft (112) moves one or more vertical gear shafts (108a-108d) move vertically. The vertical gear shaft (108a) is connected to the secondary shaft (112) via the secondary gear (114a). Similarly, the vertical gear shaft (108b) is connected to the secondary shaft (112) via the secondary gear (114b), and the vertical gear shaft (114c) is connected to a secondary shaft (not shown in FIG. 1) via the secondary gear (114c). Similarly, other vertical gear shafts (not shown in FIG. 1) are connected to corresponding secondary shafts.

A height of the Fresnel lens above the solar tube is critical towards a solar conversion efficiency of the assembly (100). In an alternate embodiment of the assembly (100), as shown in FIG. 1, the height adjustment assembly for controlling the vertical position of the Fresnel lens holder (102) may be implemented using an electromagnetic actuation mechanism. Specifically, a solenoid is positioned above the Fresnel lens holder (102), configured to generate a controllable magnetic field in response to electrical input. The Fresnel lens holder (102), or components mechanically linked to it, include ferromagnetic material, thereby enabling it to respond to the magnetic field produced by the solenoid. When the solenoid is energized, the magnetic interaction induces a vertical displacement of the Fresnel lens holder (102), effectively adjusting the height of the plurality of Fresnel lenses (104a-104n) relative to the solar tubes (106a-106n). This movement allows dynamic regulation of the focal distance between each Fresnel lens and the corresponding solar tube opening, based on the solar position and angle of incidence throughout the day. The solenoid-driven system offers a compact, frictionless, and electrically tunable alternative to the gear-based height adjustment mechanism, enabling precise and efficient tracking of solar movement to maintain optimal focusing geometry and enhance solar energy conversion efficiency.

Figure 2:
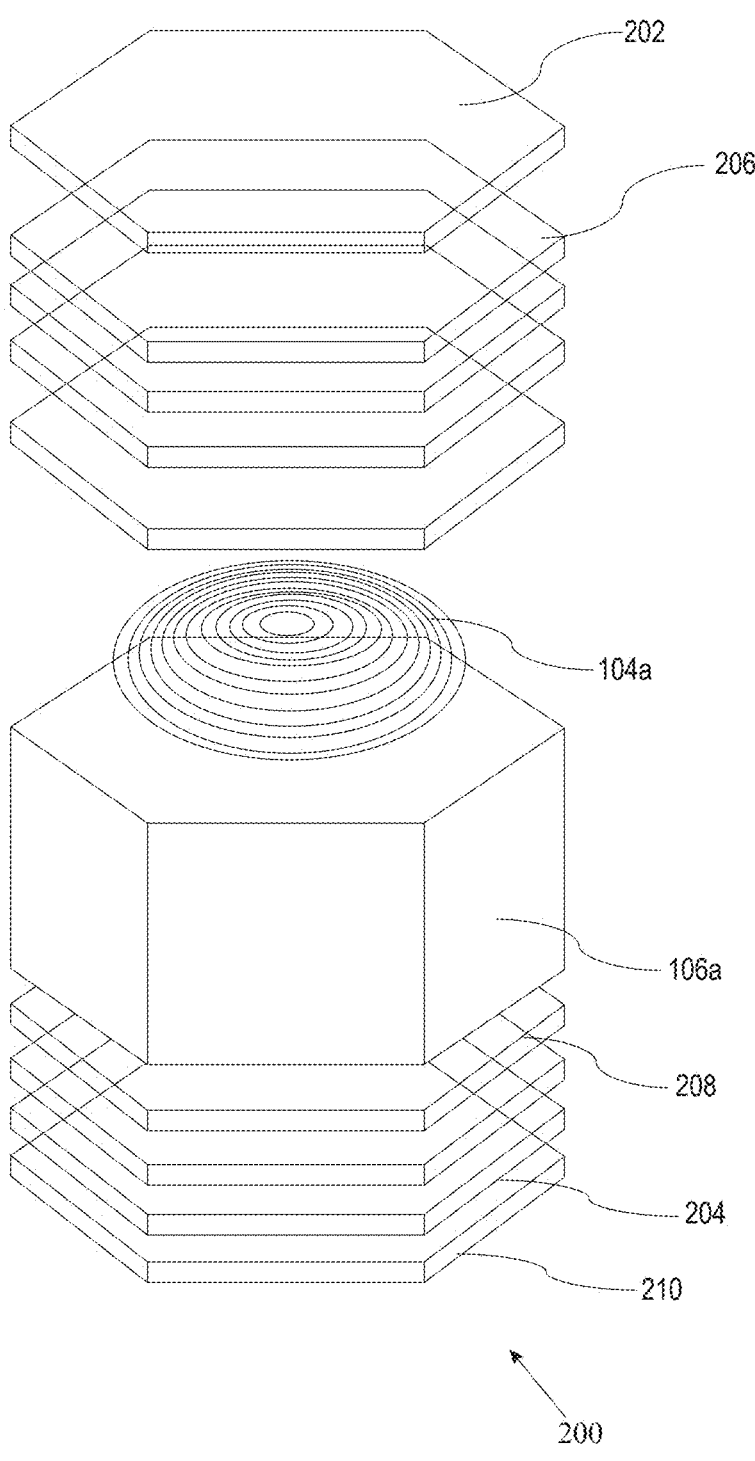
FIG. 2 shows an exploded perspective view of a single hexagonal solar tube, detailing its layered internal components.

Functioning of the assembly (100) and solar conversion process is explained with reference to a single solar tube (e.g. 106a) in FIG. 2. FIG. 2 illustrates an exploded perspective view (200) that depicts the arrangement of components associated with the solar tube (106a), highlighting both internal and external elements that function together to maximize solar energy capture and conversion.

The solar tube (106a) is a vertically oriented, hexagonal structure designed to optimize incident solar radiation through advanced light manipulation techniques. A transparent protective cover (202) and the Fresnel lens (104a) are positioned externally and upstream of the solar tube (106a) in the optical path of incoming sunlight.

The transparent protective cover (202) serves as the topmost layer, shielding the optical and photovoltaic components from environmental exposure while allowing high transmittance of the solar spectrum. The transparent protective cover (202) is constructed from impact-resistant, optically clear material and may incorporate anti-reflective and UV-stabilizing coatings to improve durability and efficiency. The transparent protective cover (202) may be constructed from high-transparency, impact-resistant materials such as tempered glass or UV-stabilized polycarbonate, and may optionally include anti-reflective and hydrophobic surface coatings. The transparent protective cover (202) functions to shield underlying optoelectronic layers from environmental degradation such as dust accumulation, UV exposure, mechanical impact, and moisture ingress, while maintaining high optical transmittance.

Positioned immediately below the transparent protective cover (202) is the Fresnel lens (104a). The Fresnel lens (104a) is an optical element configured to diverge incident solar radiation into the opening of the solar tube (106a). Purpose of the Fresnel lens (104a) is to direct solar light, especially under off-normal solar angles, into the underlying photovoltaic and photonic layers of the solar tube (106a) to maximize photon utilization for multiple internal reflections The use of a Fresnel lens (104a) is explained further with respect to FIG. 3, and allows for compact and lightweight concentration without bulk, making it ideal for modular assemblies.

Beneath the Fresnel lens, and forming part of the upper region of the solar tube (106a), is a down-conversion assembly (206). The down-conversion assembly (206) is engineered to capture high-energy UV or blue photons and re-emit them at lower, more usable wavelengths suitable for silicon-based solar cells. The down-conversion assembly (206) includes one or more photoluminescent materials capable of absorbing high-energy photons, primarily in the ultraviolet and blue regions (e.g., below 450 nm), and re-emitting photons at lower energies corresponding to the optimal bandgap range of the photovoltaic materials housed within the solar tube (106a). While multiple layers of down-conversion material may be stacked in implementation, FIG. 2 schematically shows only a single representative instance of the down-conversion assembly (206) for clarity. This spectral-shifting functionality reduces hot-carrier losses and improves the effective photon yield, thereby enhancing photovoltaic conversion efficiency.

Below the solar tube (106a), is an up-conversion assembly (208). The up-conversion assembly (208) is designed to convert low-energy infrared photons, ordinarily not absorbed by conventional solar cells, into visible light photons. The up-conversion assembly (208) comprises materials that absorb sub-bandgap photons, typically in the near-infrared region (e.g., >900 nm), and re-emit them as higher-energy photons suitable for absorption by the photovoltaic cells located above. The up-conversion assembly (208) may include rare-earth-doped crystals, quantum dots, or nanoparticle composites specifically engineered for high photoluminescent yield. The up-conversion assembly (208) enables recycling of low-energy photons that would otherwise be transmitted or lost, thereby augmenting the solar harvesting bandwidth of the system. These upconverted photons can then be absorbed by the active photovoltaic material within the tube, thus harnessing energy from parts of the spectrum that would otherwise be lost.

At the bottom of the solar tube (106a), a reflective base layer (204) is provided. The reflective base layer (204) is a mirror that reflects unabsorbed light upward, increasing the probability of photon absorption through multiple internal passes. The reflective base layer (204) is composed of one or more materials with high reflectance, such as silver, aluminium, or multi-layer dielectric coatings. The reflective surface redirects unabsorbed photons upward into the active photovoltaic region, thereby increasing their effective path length and probability of absorption. The reflective base layer (204) may also be engineered with faceted, prismatic, or angular geometries to enhance light trapping through multiple internal reflections.

Beneath or integrated with the reflective base layer (204) is a thermoelectric generation layer (210). The thermoelectric generation layer (210) leverages temperature differences between the heat absorbed within the solar tube (106a) and the surrounding environment to generate additional electrical energy using the Seabeck effect. The thermoelectric generation layer (210) adds another dimension of energy conversion, contributing to overall system efficiency. Transmission of the solar radiation through the solar tube (106a) is explained in further detail with respect to FIG. 3.

Figure 3:
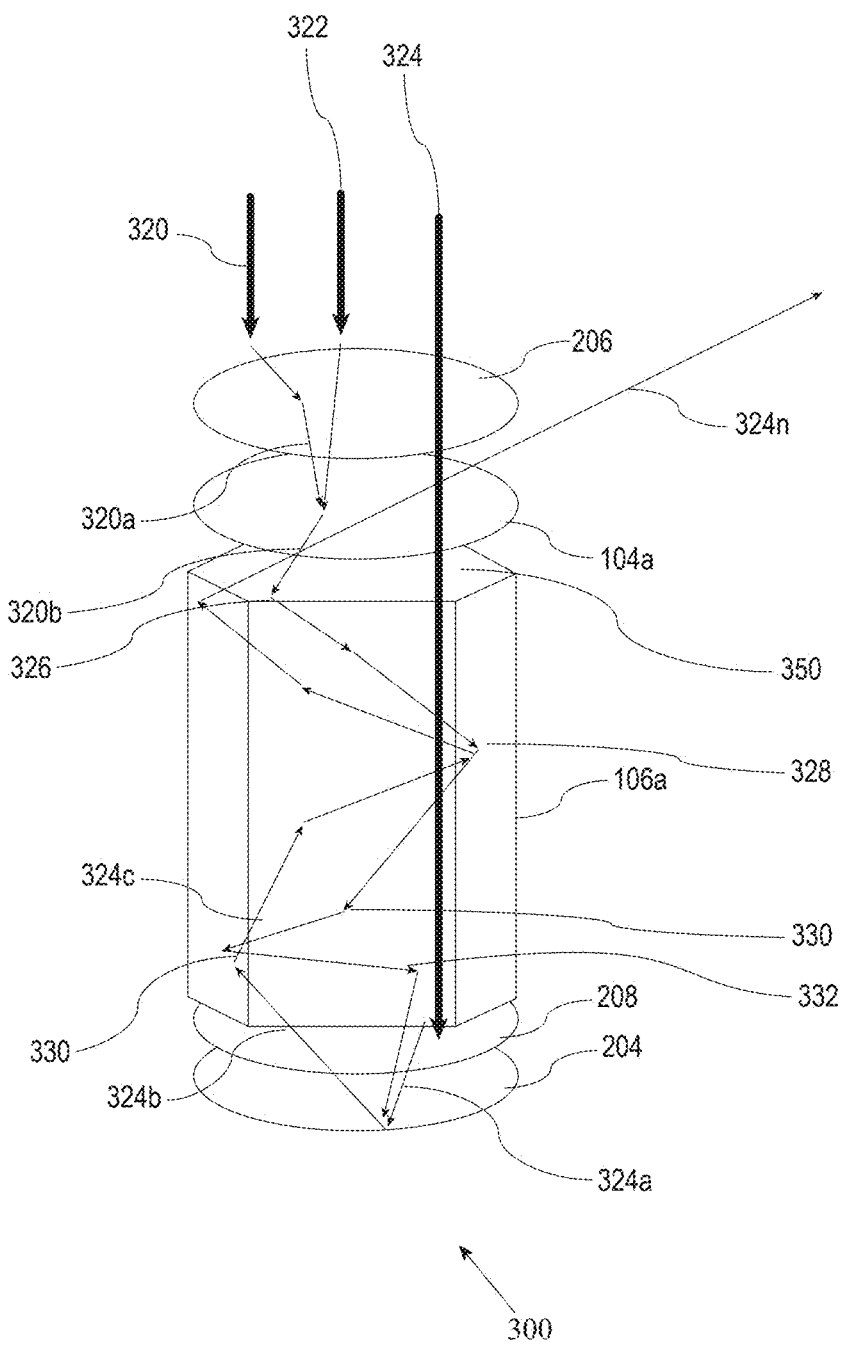
FIG. 3 depicts an optical pathway diagram for the internal working of a solar tube, according to an example embodiment.

FIG. 3 depicts an optical pathway diagram (300) for the internal working of the solar tube (106a). As shown incident solar radiation comprises of three components, ultraviolet light (320), visible light (322) and infrared light (324). The down-conversion assembly (206) is configured to convert the ultraviolet light (320) into a visible light component (320a), which merges with the visible light (322) to form visible light component (320b). The visible light component (320b) is diverged through the Fresnel lens (104a) to hit the solar tube (106a) at point (326). The Fresnel lens (104a) is adjusted at a height that facilitates an angle of incidence of the visible light (322) at the point (326). The position of the point (326) is typically adjusted towards a top portion (350) of the solar tube (106a), to increase a number of reflections (328-332) of the visible light component (320b) within the solar tube (106a). The visible light component (320b), passes through the up-conversion assembly (208), and gets reflected by the reflective base layer (204), to form the reflected light (324b).

Further, the infrared light (324) passes through the down-conversion assembly (206) and the Fresnel lens (104a) unattenuated. However, when the infrared light (324) passes through the up-conversion assembly (208) it gets converted to visible light component (324a). The visible light component (324a) gets reflected by the reflective base layer (204) and to form the visible light component (324b). The visible light component (324b) also undergoes multiple reflections within the solar tube (106a) before exiting from the solar tube (106a). The visible light component (324n) that exits from the solar tube (106a), is of attenuated intensity, as with every reflection within the solar tube (106a), solar energy is captured, and converted into electrical energy.

By positioning the initial point of incidence of the visible light component (320a) at a higher location (326) on the inner wall of the solar tube (106a), such as near the upper portion (350), a greater number of internal reflections can be induced. This strategic placement initiates an optical whirl, wherein the solar light undergoes multiple bounces within the inner surface of the solar tube (106a). The longer the path traversed by the visible light component (320b) and the reflected visible light component (324b) within the solar tube (106a) through successive reflections, the greater the opportunity for photon absorption by the solar cells, thereby enhancing overall solar energy conversion efficiency. The assembly (100) further incudes an arrangement of capturing the electric energy at the point of generation of the electrical energy within the solar tube (106a). Details of capturing the electric energy generated is explained further with respect to FIG. 4.

Figure 4:
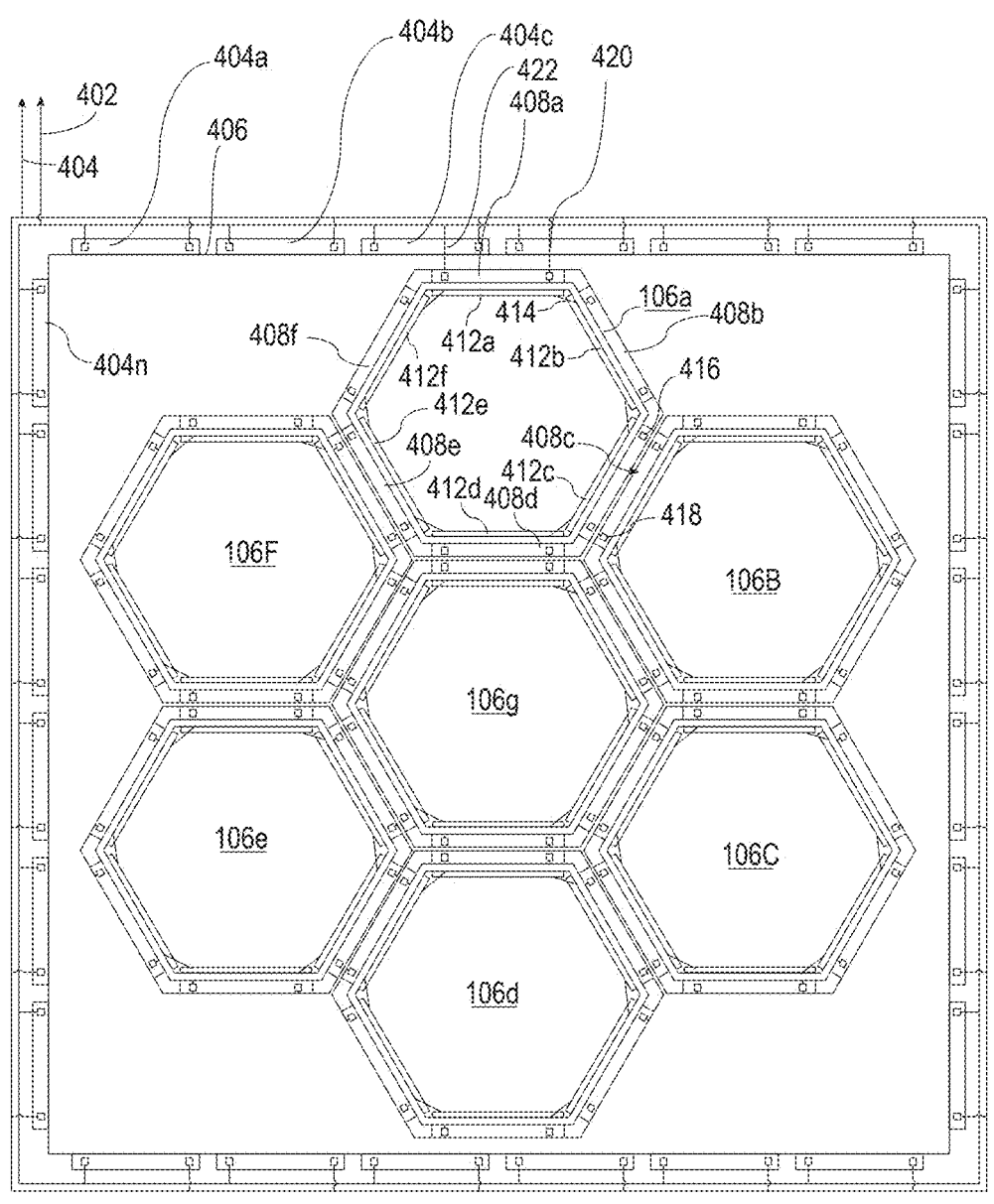
FIG. 4 presents a top view of an interlaced electrical connection layout of multiple solar bricks arranged in a tessellated hexagonal configuration, according to an example embodiment.

FIG. 4 presents a top view of an interlaced electrical connection layout (400) of multiple solar tubes (106a-106g) arranged in a tessellated hexagonal configuration. Typically, the plurality of solar tubes (106a-106n) can be arranged in one or more configurations. This configuration exemplifies one possible arrangement among several envisioned configurations that fall within the scope of the present disclosure. The tessellated layout allows for compact packing of the solar tubes, enhancing the surface area available for solar energy collection while facilitating efficient electrical interconnection.

The layout (400) includes a positive terminal (402) and a negative terminal (404), for carrying the electric charge generated from the set of solar tubes (106a-106g) to an external circuit. The layout (400) further includes a plurality of brick Ultra Capacitors (404a-404n), a brick body (406), a set of six solar Ultra Capacitors (408a-408f) surrounding each solar tube (106a), a layer of solar cells (412a-412f) lined inside the each solar tube (106a), wherein a layer of solar cell (412a) is lined against an internal wall of the solar tube (106a).

The layers of solar cells (412a-412f) are connected in series. For example, the layer (412a) is connected to the layer (412b) via series connection (414), thereby enabling voltage addition and cumulative power generation. The each layer of solar cell is connected to a corresponding solar capacitor via an electric connection. For example, the layer of solar cell (412c) is connected to the solar capacitor (408c) via electric connection (416) and (418). The electric connection (416) connects positive terminal of the layer of solar cell (412c) to a positive terminal of the solar capacitor (408c). Similarly, the electric connection (418) connects negative terminal of the layer of solar cell (412c) to a negative terminal of the solar capacitor (408c).

The electric charge collected in each of the solar Ultra Capacitors (408a-408f), are connected via electric connections (420) and (422) to the negative terminal (404) and the positive terminal (402). Once electrical energy is stored in each of the Ultra Capacitors (408a-408f), it is transmitted via connections (420) and (422) to the main terminals which are the positive terminal (402) and the negative terminal (404). In parallel, the set of brick Ultra Capacitors (404a-404n) is also connected across the main terminals, serving as a stabilizing buffer or surge reservoir for the generated electrical output.

A key feature of this architecture lies in the physical proximity between the solar cell layers and their associated Ultra Capacitors. Due to proximity of the plurality of solar to the layers of solar cells, for example solar capacitor (408a) is proximate to solar cell (412a), the electric energy is collected as soon as it is generated. For example, as soon as solar energy is converted to electric energy by the layer of solar cells (412a-412f) of solar tube (106a), the electric energy is collected by the solar Ultra Capacitors (408a-408f), that are connected in series, and transferred to the main electric terminals (402) and (404). Due to the proximity, of the connections, the electric energy or electrons do not have to travel long distances before being captured and stored, thereby conserving energy and increasing efficiency of the solar tube (106a) and of the whole assembly (100) as well. The short distance ensures that the electrical energy generated through photon conversion is captured immediately by the adjacent capacitor, reducing transmission losses. The close-coupled configuration of the layout (400) improves the overall energy capture efficiency of each individual solar tube and enhances the system-wide performance of the solar tube assembly (100).

Further, as shown the plurality of brick Ultra Capacitors (404a-404n) are connected in parallel to the negative terminal (404) and the positive terminal (402). The brick Ultra Capacitors (404a-404n) are high-capacity, energy-buffering components that serve as a secondary energy storage layer within the solar tube assembly (400). These Ultra Capacitors are connected in parallel across the main positive (402) and negative (404) terminals. Their primary function is to stabilize, buffer, and smoothen the flow of electrical energy generated by the solar cells (412a-412f) and stored in the individual solar Ultra Capacitors (408a-408f). By absorbing excess energy and compensating for fluctuations in current output caused by variable sunlight conditions (e.g., shading, cloud movement), the brick Ultra Capacitors enhance the reliability and consistency of the electrical output.

In addition, the brick Ultra Capacitors act as charge reservoirs, ensuring that even when a transient demand or sudden energy extraction occurs in the external load circuit, a ready supply of electric energy is available to meet that demand without putting strain on the individual solar Ultra Capacitors. This buffering mechanism significantly improves voltage stability, reduces ripple, and prolongs the life cycle of downstream power electronics and batteries.

The brick body (406) structurally houses and supports the brick Ultra Capacitors (404a-404n) within the larger electrical layout (400). It is typically fabricated from thermally conductive yet electrically insulating materials, such as composite ceramics or polymer blends with embedded heat-dissipating fillers. The brick body serves multiple key purposes. For example, the brick body dissipates heat generated during rapid charging and discharging cycles of the Ultra Capacitors, helping maintain safe operating temperatures and preventing thermal degradation of components. It provides robust physical housing and shock absorption, protecting the sensitive brick Ultra Capacitors from environmental stressors, vibrations, and mechanical damage during installation or operation. The brick body also incorporates embedded traces or insulated channels that guide electrical connections in a secure, low-loss, and compact layout. This minimizes stray inductance and EMI (electromagnetic interference) across the layout.

Further, the brick body forms a modular unit that can be easily inserted, replaced, or scaled within the overall photovoltaic assembly. This modularity supports maintenance, scalability, and future upgrades. Together, the brick Ultra Capacitors and the brick body contribute to a hybrid energy management strategy, where individual solar Ultra Capacitors manage ultra-fast, localized energy collection from their respective solar cell layers, and the brick Ultra Capacitors provide a collective, stabilized energy reservoir for the system-wide output. This design improves both micro-level and macro-level energy reliability and conversion efficiency in the solar tube array.

The present invention offers significant improvements over conventional photovoltaic (PV) systems by introducing a vertically integrated, multi-layer solar energy harvesting architecture that addresses key limitations of centralized power systems and standard 2D solar panels. Traditional PV systems are constrained by transmission losses, limited spectral responsiveness, angle dependence, and inefficiencies in photon-to-electron conversion pathways. This invention overcomes those limitations through a compact, modular solar assembly that integrates advanced optics, spectral conversion, thermoelectric generation, and localized energy storage.

At the core of the invention is a vertically aligned solar tube structure equipped with a Fresnel lens positioned above each tube. This lens concentrates and directs incident sunlight deep into the tube, intensifying photon flux upon the internal photovoltaic layers. A unique feature of the system is the dynamic focusing mechanism-a height-adjustable assembly powered either by a stepper motor with ultra-low-speed rotational control (0.05-0.2 mm over 8-12 hours) or an alternative solenoid-driven magnetic actuator. This mechanism fine-tunes the vertical position of the Fresnel lens to maintain optimal focal alignment throughout the solar cycle, thereby increasing the consistency and effectiveness of solar capture.

The focused light enters the tube at a carefully controlled angle to induce a spiral pattern of internal reflections, forming an "optical whirl." This whirl dramatically increases the optical path length of photons within the tube, raising the probability of photon absorption by the embedded solar cells. This extended interaction, combined with the vertical orientation and reflective base layer, results in a significantly higher solar-to-electric conversion efficiency than conventional flat-panel systems.

The invention further expands spectral utilization through the integration of down-conversion and up-conversion layers. These layers convert otherwise unused ultraviolet and infrared radiation into wavelengths that can be effectively absorbed by the primary photovoltaic layers. This feature allows the system to leverage a broader portion of the solar spectrum, improving total energy output.

One of the most critical innovations of this design is the proximity-based energy collection. Solar Ultra Capacitors are strategically placed near the solar cell layers inside each tube. This immediate energy storage at the point of generation minimizes resistance losses caused by long-distance electron travel through external wiring and busbars, as seen in traditional systems. The Ultra Capacitors directly absorb and store the generated electricity, ensuring that energy is not lost between conversion and storage stages.

The base of each tube includes a thermoelectric module, which capitalizes on heat differentials within the structure to produce supplemental electricity. This dual-harvesting capability allows the system to reclaim energy that would otherwise be wasted as thermal dissipation, further enhancing the efficiency and sustainability of the design.

Structurally, the layout features a tessellated hexagonal array of solar tubes, optimized for space efficiency and modular scalability. This geometric arrangement not only supports tight, interlocking deployment in space-constrained environments—such as rooftops, urban zones, or integrated architectural facades, but also provides mechanical stability. Each solar tube is encased in a robust, transparent, impact-resistant shell with anti-reflective and UV-stabilized coatings. These protective layers ensure environmental durability and sustained optical performance under varying weather conditions, including dust, impact, and UV exposure.

Furthermore, the solar tube's internal layering structure is carefully engineered to create a seamless photonic-to-electronic interface. The solar cells, conversion films, thermoelectric layers, and energy storage Ultra Capacitors are aligned in a continuous vertical stack, enabling compact integration of multiple energy harvesting pathways within a single structure.

Together, these advantages result in a high-performance, low-maintenance, and highly adaptable renewable energy solution. The invention's capacity to deliver reliable, decentralized electricity generation with minimal infrastructure, broad spectral responsiveness, localized energy storage, and scalable deployment makes it a transformative solution for future solar energy applications across residential, commercial, and industrial domains.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The invention claimed is:

1. A photovoltaic solar assembly, comprising:

a transparent protective cover (202) configured to transmit incident solar radiation while protecting underlying components, wherein the incident solar radiation comprises ultraviolet light (320), visible light (322) and infrared light (324);

a down-conversion assembly (206) configured to:

convert ultraviolet light (320) present in the incident solar radiation into visible light component (320a) suitable for photovoltaic absorption, and pass infrared light (324) and the visible light (322) present in the incident solar radiation unattenuated, wherein the visible light component (320a) merges with the visible light (322) to form a visible light component (320b);

a plurality of solar tubes (106a-106n), each solar tube having photovoltaic layers configured to capture and convert incident visible light into electrical energy;

a plurality of Fresnel lenses (104a-104n), each Fresnel lens (104a) aligned at an adjustable distance above a corresponding solar tube (106a) to direct the visible light component (320b) at a higher location (326) on an inner wall of the corresponding solar tube (106a) having the photovoltaic layers, wherein the higher location (326) is near an upper portion (350) of the corresponding solar tube (106a);

a Fresnel lens holder (102) supporting the plurality of Fresnel lenses (104a-104n);

an up-conversion assembly (208) arranged below the each solar tube (106a) configured to convert the infrared light (324) that are unabsorbed in the corresponding solar tube (106a) into a visible light component (324a);

a reflective base layer (204) arranged below the up-conversion assembly (208) is configured to reflect unabsorbed light back into the each solar tube (106a), wherein the unabsorbed light comprises the visible light component (324a); and a height adjustment assembly configured to dynamically adjust a vertical distance between the each Fresnel lens (104a) and the corresponding solar tube (106a) in response to solar movement to ensure the incident solar radiation strikes first at the higher location (326), wherein a first incidence of the incident solar radiation on the higher location (326) induces multiple successive internal reflections at a plurality of points on the inner wall of the corresponding solar tube (106a), and wherein the visible light component (324b) undergoes multiple reflections within the corresponding solar tube (106a) before exiting from the corresponding solar tube (106a); and wherein with every reflection solar energy is captured and converted into electrical energy, wherein the height adjustment assembly comprises a stepper motor (120) configured to cause vertical movement and adjust a height of the Fresnel lens holder (102) by rotating continuously over a duration of 8 to 12 hours to produce a vertical displacement of the Fresnel lens holder (102) ranging from 0.05 mm to 0.2 mm during the duration.

2. The photovoltaic solar assembly of claim 1, wherein the higher location (326) on the inner wall is located at a distance of less than 25% of a height of the corresponding solar tube from the top opening, to increase localized photon density and enhance proximity-based energy conversion.

3. The photovoltaic solar assembly of claim 1, further comprising:

a tessellated hexagonal configuration of the plurality of solar tubes, the each solar tube comprising:

a cylindrical inner wall;

a layer of solar cells disposed on the inner wall and configured to convert the incident solar radiation into electrical energy;

a plurality of solar Ultra Capacitors, each solar Ultra capacitor positioned in physical proximity to the each solar tube and electrically connected to the layer of solar cells;

a set of series electrical connections configured to connect the layers of solar cells of adjacent solar tubes to enable cumulative voltage output;

a set of main terminals comprising a positive terminal and a negative terminal, electrically connected to the plurality of solar Ultra Capacitors for outputting stored electrical energy; and a plurality of brick Ultra Capacitors electrically connected in parallel across the main terminals, configured to buffer or stabilize the cumulative electrical output.

4. The photovoltaic solar assembly of claim 1, wherein the height adjustment assembly comprises:

a main shaft (116);

at least one secondary shaft (112);

a set of vertical gear shafts (108a-108d);

one or more secondary gears (114a-114d) operably linking the at least one secondary shaft (112) to the set of vertical gear shafts (108a-108d);

a main gear (118) operably coupled to the main shaft (116); and wherein the stepper motor (120) configured to drive the main gear (118), wherein rotation of the stepper motor (120) causes vertical movement of the set of vertical gear shafts (108a-108d), thereby adjusting the height of the Fresnel lens holder (102).

5. The photovoltaic solar assembly of claim 1, wherein the each solar tube (106a) comprises:

a thermoelectric generation layer (210) configured to convert heat differentials into electrical energy.

6. The photovoltaic solar assembly of claim 5, wherein the down-conversion assembly (206) comprises photoluminescent materials configured to absorb ultraviolet photons below 450 nm and re-emit the ultraviolet photons in a wavelength range suitable for photovoltaic cells present within the each solar tube (106a).

7. The photovoltaic solar assembly of claim 5, wherein the up-conversion assembly (208) comprises rare-earth-doped materials, quantum dots, or nanoparticle composites configured to emit visible light from absorbed near-infrared radiation above 900 nm.

8. The photovoltaic solar assembly of claim 5, wherein the reflective base layer (204) comprises faceted or angular geometries to cause repeated internal reflections of unabsorbed light within the corresponding solar tube.

9. The photovoltaic solar assembly of claim 1, wherein the each Fresnel lens (104a) is dynamically aligned to ensure an angle of incidence that maximizes internal reflection and photon absorption within the corresponding each solar tube (106a).

* * * * *